United States Patent [19]

Massey et al.

[11] Patent Number: 4,797,922
[45] Date of Patent: Jan. 10, 1989

[54] METHOD OF, AND APPARATUS FOR, TRANSFORMING A DIGITAL DATA SEQUENCE INTO AN ENCODED FORM

[75] Inventors: James L. Massey, Zürich; Rainer A. Rueppel, Wetzikon, both of Switzerland

[73] Assignee: Borer Electronics AG, Biberist, Switzerland

[21] Appl. No.: 791,715

[22] Filed: Oct. 28, 1985

[30] Foreign Application Priority Data

Nov. 2, 1984 [CH] Switzerland ................ 05249/84

[51] Int. Cl.⁴ ............................................. H04L 9/04
[52] U.S. Cl. ...................................... 380/46; 364/717
[58] Field of Search ................ 364/717; 178/22.15; 331/78; 380/46

[56] References Cited

U.S. PATENT DOCUMENTS

| | | | |
|---|---|---|---|
| 3,911,330 | 10/1975 | Fletcher et al. | 178/22.15 |
| 3,984,668 | 10/1976 | Zetterberg et al. | 380/44 |
| 4,032,763 | 6/1977 | Glitz | 364/717 |
| 4,047,008 | 9/1977 | Perkins | 364/717 |
| 4,181,816 | 1/1980 | Vasseur | 380/46 |
| 4,264,781 | 4/1981 | Oosterbaan et al. | 380/46 |
| 4,450,321 | 5/1984 | Quigley et al. | 364/717 |
| 4,493,046 | 1/1985 | Watanabe | 364/717 |
| 4,507,746 | 3/1985 | Fletcher, Jr. | 364/717 |
| 4,511,988 | 4/1985 | Michel et al. | 364/717 |
| 4,685,132 | 8/1987 | Bishop et al. | 380/46 |

FOREIGN PATENT DOCUMENTS

0119972 9/1984 European Pat. Off. .
2706421 2/1977 Fed. Rep. of Germany .
1179330 9/1985 U.S.S.R. ................... 364/717

OTHER PUBLICATIONS

IBM Technical Disclosure Bulletin, vol. 14, No. 10, Mar. 1972, pp. 2978-2979.
IEEE Transactions on Information Theory, vol. IT-24, No. 5, Sep. 1978, "Hiding Information and Signatures in Trapdoor Knapsacks", by R. C. Merkle, and M. E. Hellman.

*Primary Examiner*—Salvatore Cangialosi
*Attorney, Agent, or Firm*—Neuman, Williams, Anderson & Olson

[57] ABSTRACT

A converter or running-key for generator producing pseudo-random sequences under the supervision of a secret or confidential key or code is substantially formed by a combination device containing a memory circuit and a feedback circuit. Periodic digital sequences are summed in an adder circuit, and the thus obtained composite digital sequence is separated in a divider circuit. A part of this composite digital sequence is used as a digital feedback sequence which is fed to an input of the same adder circuit through the feedback circuit comprising an auxiliary digital memory device or storage and an auxiliary logic circuit. In this manner, the desired memory and feedback is achieved which results in more complicated or complex pseudo-random sequences. In an advantageous exemplary embodiment, a substitution block is inserted as the auxiliary digital memory device or storage. This substitution block can be implemented by a commercially available read-and-write memory (RAM).

18 Claims, 2 Drawing Sheets

METHOD OF, AND APPARATUS FOR, TRANSFORMING A DIGITAL DATA SEQUENCE INTO AN ENCODED FORM

BACKGROUND OF THE INVENTION

The present invention broadly relates to digital data sequences and more specifically pertains to a new and improved method of, and apparatus for, encoding or enciphering digital data sequences.

In its more particular aspects the present invention relates to a method of, and apparatus for, encoding or enciphering digital data sequences by transforming such data sequences into an encoded or enciphered data sequence under the supervision of a confidential or secret key or code for the protected transmission or storage of such digital data sequences. The digital data sequence is combined with a digital pseudo-random sequence produced by a converter or running-key generator.

Various encoding or enciphering systems are already known. Some of these systems are described, for example, in the textbook "CIPHER SYSTEMS, The Protection of Communications" by Henry Beker and Fred Piper, Northwood Publications London, 1982. In such systems, for example, messages or other data in binary code are combined with a pseudo-random sequence produced by a running-key generator under the supervision of a secret key to form the enciphered sequence that is, stored and/or transmitted and then decoded or deciphered. The knowledge of a confidential or secret code or key is obviously necessary for the decoding or deciphering operation. The synchronizing methods for transmitting the encoded or enciphered data and for its decoding or deciphering are also known and are also described in the aforementioned textbook. In this textbook, a converter or running-key generator for generating or producing pseudo-random sequences is described and illustrated on Page 237, FIG. 6.8. This converter or running-key generator operates using a number of feedback-connected shift registers whose periodic digital output sequences are combined. This method of combining the periodic digital sequences, however, utilizes neither memory nor feedback and thus the effectiveness of the encoding or enciphering is limited.

SUMMARY OF THE INVENTION

Therefore, with the foregoing in mind, it is a primary object of the present invention to provide a new and improved method of, and apparatus for, encoding or enciphering digital data sequences, which method and apparatus do not exhibit the aforementioned drawbacks and shortcomings of the prior art methods and constructions.

Another and more specific object of the present invention aims at providing a new and improved method of, and apparatus for, encoding or enciphering digital data sequences that significantly increase the security of the encoding or enciphering by increasing the complexity of the pseudo-random sequence that is combined with the digital data sequence.

Yet a further significant object of the present invention is to provide a new and improved method of, and apparatus for, encoding or enciphering digital data sequences that significantly increase the security of the encoding or enciphering by increasing the complexity of the pseudo-random sequence that is combined with the digital data sequence and which apparatus is relatively simple in construction and design, highly reliable in operation, not readily subject to breakdown or malfunction and requires a minimum of maintenance and servicing.

Now in order to implement these and still further objects of the invention, which will become more readily apparent as the description proceeds, the method of the present development is manifested by the features that, in the converter or running-key generator, at least two periodic digital sequences from a periodic sequence generator are fed into at least one adder circuit in order to form a composite digital sequence. The composite digital sequence from the adder circuit is divided in a divider circuit or splitter into a digital output sequence which constitutes the above-mentioned pseudo-random sequence and into a digital feedback sequence which is composed of or contains symbols. The symbols of the digital feedback sequence are buffered in an auxiliary digital memory device or storage means. Such symbols buffered in the auxiliary digital memory device or storage means are transformed with the aid of an auxiliary logic circuit means or device into symbols of an auxiliary digital sequence. This auxiliary digital sequence is then fed into the same adder circuit as were the at least two periodic digital sequences.

One advantage of the invention resides in the fact that the combining of the at least two periodic digital sequences makes use of memory features as well as feedback features, so that the or enciphering is more secure because a more complex pseudo-random sequence can be obtained.

It is advantageous, if a substitution block is employed as the auxiliary digital storage means.

It is one advantage of the invention that the substitution block makes the feedback non-linear and that the magnitude of the value of a symbol of the digital feedback sequence bears no direct relation to the magnitude of the value of the corresponding symbol of the auxiliary digital sequence when using a randomly filled substitution block.

It is advantageous for the divider circuit to output the least significant bit of a related symbol of the composite digital sequence as the corresponding symbol of the output sequence that constitutes the pseudo-random sequence and an integral or integer value of the remaining bits of the related symbol of the composite digital sequence as the corresponding symbol of the output sequence that constitutes the digital feedback sequence.

It is further advantageous that a symbol is stored in its binary representation in the auxiliary digital storage means and that the auxiliary logic circuit means causes the aforementioned related symbol of the auxiliary digital sequence to correspond to the integral or integer sum of the bits of the symbol stored or buffered in the auxiliary digital storage means.

The periodic sequences are advantageously formed by output sequences of feedback-connected shift registers.

According to another variant of the inventive method, the periodic sequences are formed as a bit-by-bit product of each one of the output sequences of the feedback-connected shift registers with a related output sequence of a stage of a feedback-connected preselectable binary shift register.

It is further advantageous when the digital data sequence and the pseudo-random sequence are binary sequences and the combination of these two sequences constitutes their bit-by-bit modulo 2 sum.

It is also advantageous when the enciphered digital data sequence and the pseudo-random sequence are binary sequences and the combination of these two sequences constitutes their bit-by-bit modulo 2 sum.

A secret or confidential code or key advantageously determines the initial states of all the feedback-connected shift registers and the initial state condition of the auxiliary digital storage means.

The decoded form of the digital data sequence is regenerated during a decoding operation by combining its encoded form with the digital pseudo-random sequence under the supervision of the secret or confidential code or key.

As alluded to above, the invention is not only concerned with the aforementioned method aspects but also relates to a new and improved construction of an apparatus for encoding or enciphering digital data sequences. Such apparatus contains means for transforming a digital data sequence into an encoded or enciphered digital data sequence under the supervision of a secret key. A converter or running-key generator for producing a pseudo-random sequence and combination means for combining the digital data sequence and the pseudo-random sequence are provided in such apparatus.

More specifically, a simple exemplary embodiment of the invention contains:

a periodic sequence generator which has at least two outputs connected to an adder circuit. The output of the adder circuit is connected to a divider circuit. One output of the divider circuit delivers or outputs the pseudo-random sequence and a second output of the divider circuit is connected to an auxiliary digital storage means that has an output connected to the input of the adder circuit through an auxiliary logic circuit means.

An advantageous construction of the inventive apparatus comprises the following:

a periodic sequence generator that has at least two outputs connected to an adder circuit, whose output is connected to a further adder circuit. The last-mentioned adder circuit has the function of a divider, one output of which delivers or outputs the pseudo-random sequence and other outputs of which are connected with a substitution block whose output is connected with the input of this same further adder circuit.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
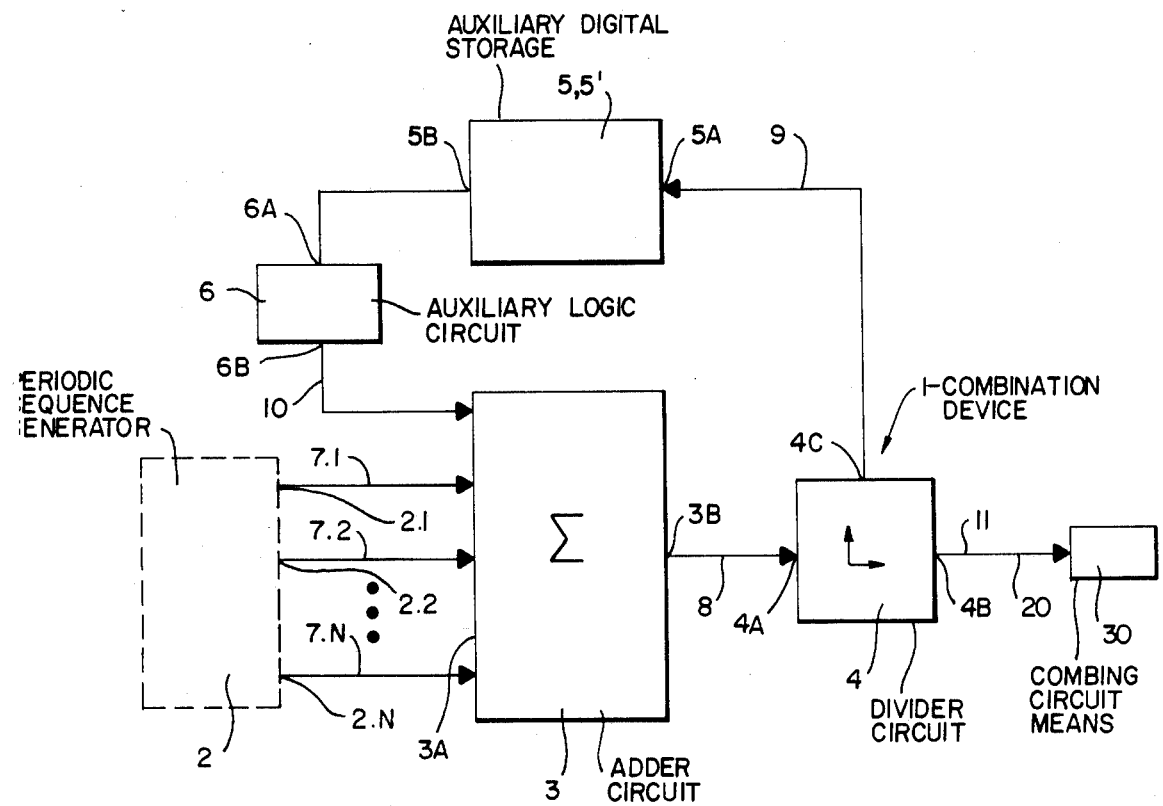
FIG. 1 is a block circuit diagram of a first exemplary embodiment of the apparatus according to the invention.

Describing now the drawings, it is to be understood that to simplify the showing thereof only enough of the structure of the apparatus for encoding or enciphering digital data sequences has been illustrated therein as is needed to enable one skilled in the art to readily understand the underlying principles and concepts of this invention. Turning now specifically to the block circuit diagram of FIG. 1 of the drawings, the apparatus illustrated therein by way of example and not limitation will be seen to comprise a combination device or means 1 including storage means or a memory and feedback facilities. A periodic sequence generator 2 with a predetermined number of outputs or terminals 2.1, 2.2 . . . 2.N is schematically illustrated by broken lines. The sequence generator 2 is connected with an input side 3A of an adder circuit 3 by the multiple outputs or terminals 2.1, 2.2 . . . 2.N. An output 3B of the adder circuit 3 is connected with an input 4A of a divider circuit 4. The divider circuit 4 has two outputs 4B and 4C. The first output 4B is connected to an output 20 of the apparatus which supplies or outputs a digital pseudo-random sequence or pseudo-random sequence 11. The second output 4C is connected with an input 5A of an auxiliary digital memory device or storage means 5. An output 5B of the auxiliary digital storage means 5 is connected with the input side 3A of the adder circuit 3 through an auxiliary logic circuit means or device 6 having an input 6A and having an output 6B which is connected with the input side 3A of the adder circuit 3. The auxiliary digital storage means 5 can be constructed as a substitution block 5'. The digital data sequence and the pseudo-random sequence are combined in conventionally constructed combining circuit means 30 in order to obtain an enciphered digital data sequence.

The principle of operation should be readily apparent from the description with respect to FIG. 1. The periodic sequence generator 2 supplies a number of periodic digital data sequences 7.1 to 7.N which are summed in the adder circuit 3. A composite digital sequence 8 thus obtained is fed to the divider circuit 4. The last symbol of a digital feedback sequence 9 is stored or buffered in the auxiliary digital storage means 5. The output sequence of this auxiliary digital storage means 5 is fed to the auxiliary logic circuit means that produces an auxiliary digital sequence 10 which is delivered to the input side 3A of the adder circuit 3. In this manner, the auxiliary digital sequence 10 is fed to the adder circuit 3 in addition to the periodic digital data sequences 7.1 to 7.N.

Figure 2:
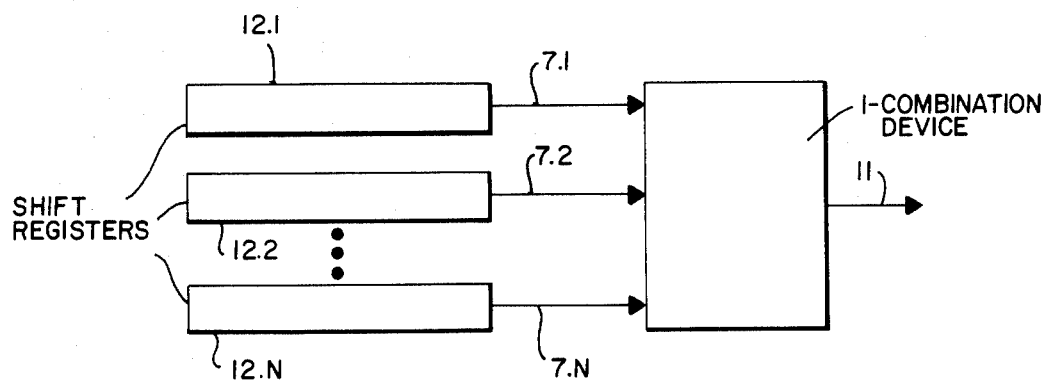
FIG. 2 is a block circuit diagram of a simply constructed second exemplary embodiment of the apparatus according to the invention.

FIG. 2 shows a block circuit diagram of a simple second exemplary embodiment of the inventive apparatus. The combination device 1 shown in FIG. 1 is illustrated in FIG. 2 only as one block 1 for purposes of illustrative clarity. A number of shift registers 12.1 to 12.N supply the periodic digital data sequences 7.1 to 7.N to the combination device 1. The shift registers 12.1 to 12.N are feedback-connected in the present exemplary embodiment. The function of this arrangement corresponds to that described with respect to FIG. 1.

Figure 3:
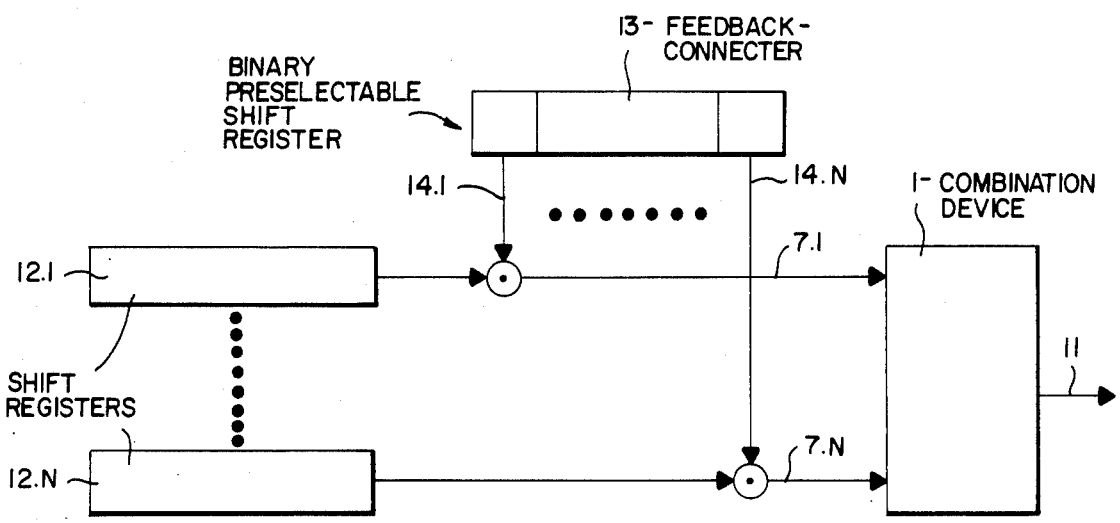
FIG. 3 is a block circuit diagram of a third exemplary embodiment of the inventive apparatus.

FIG. 3 shows a third exemplary embodiment of the inventive apparatus. A number of shift registers 12.1 to 12.N are also used in this embodiment as is the case in the embodiment shown in FIG. 2. A feedback-connected binary preselectable shift register 13 is additionally employed. The individual stages of the binary preselectable shift register 13 are connected to the outputs of the digital shift registers 12.1 to 12.N. These stages of the feedback-connected binary preselectable shift register 13 provide the corresponding digital data sequences 14.1 to 14.N. Especially complex digital pseudo-random sequences 11 are obtained by means of this configuration.

Figure 4:
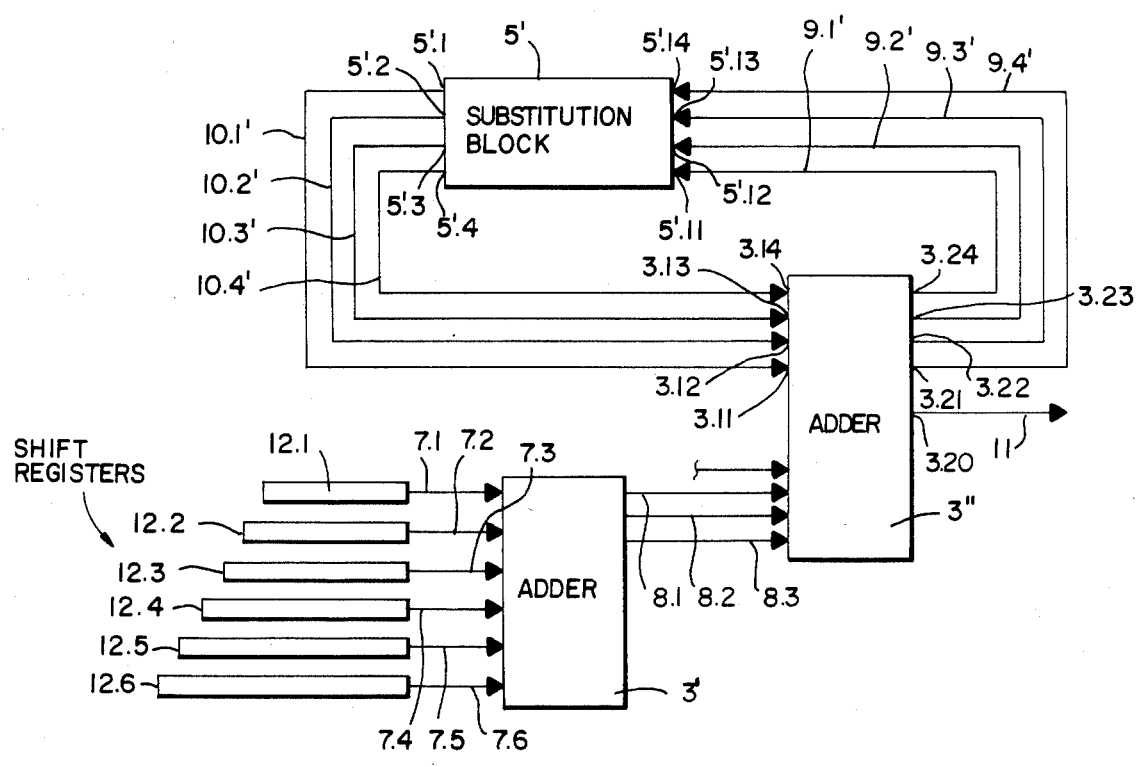
FIG. 4 is a block circuit diagram of a fourth exemplary embodiment of the inventive apparatus.

A further advantageous and fourth exemplary embodiment of the inventive apparatus is illustrated in FIG. 4. The periodic digital data sequences 7.1 to 7.6 are formed by means of six feedback-connected shift registers 12.1 to 12.6. The output bits of the shift registers 12.1 to 12.6 are fed to first inputs 3.1 to 3.6 of a composite adder circuit 3', 3" and these inputs constitute the inputs of a first adder circuit 3'. This first adder circuit 3' forms a six-stage single-bit adder circuit and produces a three-bit result. This three-bit result is added to the four feedback bits 10.1' to 10.4' which are received from related outputs 5'.1 to 5'.4 of a substitution block 5' at second inputs 3.11 to 3.14 of the composite adder circuit 3', 3", specifically at related inputs of a second adder circuit 3" comprising a two-stage four-bit adder and a divider. The least significant bit of the result of this addition is used as a bit of the digital pseudo-random sequence 11 which is produced at a first output 3.20 of the second adder circuit 3" and available at the output 20 of the converter or running-key generator of this apparatus. At second outputs 3.21 to 3.24 of the second adder circuit 3" there appear the remaining bits which serve as address bits 9.1' to 9.4' for the substitution block 5'. The address bits 9.1' to 9.4' which are applied to related inputs 5'.11 to 5'.14 of the substitution block 5' determine the values of the feedback bits 10.1' to 10.4' which, in turn, are used as inputs for the two-stage four-bit adder circuit 3". The substitution block 5' is formed by using a commercially available read-and-write memory (RAM).

It is to be understood that the converters or running-key generators can be used with various other sources of periodic digital data sequences while still retaining the concepts of the invention. Various combinations of these components can be employed when using the feedback-connected shift registers 12.1 to 12.N and the feedback-connected binary preselectable shift register 13.

While there are shown and described present preferred embodiments of the invention, it is to be distinctly understood that the invention is not limited thereto, but may be otherwise variously embodied and practiced within the scope of the following claims. Accordingly,

What we claim is:

1. Apparatus for generating a complex first pseudo-random digital sequence, said apparatus comprising:
   (a) generating means for generating at least second and third periodic, pseudo-random digital sequences;
   (b) summing means for receiving as inputs at least said second and third periodic, pseudo-random digital sequences and an auxiliary digital sequence for providing an output as a digital sum of said inputs, said digital sum output comprising a sequence of pluralities of bits, each of said pluralities of bits forming the integer sum of the corresponding bits of at least said second and third pseudo-random digital sequences and of said auxiliary digital sequence, each of said pluralities of bits comprising a selected one bit and the remaining bits, a sequence of said selected one bits forming said first pseudo-random digital sequence, and
   (c) feedback means for receiving and feeding back said remaining bits as said auxiliary digital sequence to said summing means, whereby said first pseudo-random digital sequence is rendered more complex than said second and third pseudo-random digital sequences.

2. The generating apparatus as claimed in claim 1, wherein said feedback means comprises storage means for storing and delaying the application of said remaining bits to said summing means with respect to the receipt of said bits of at least said second and third digital sequences.

3. The generating apparatus as claimed in claim 1, wherein a secret key is used to initialize said generating means.

4. The generating apparatus as claimed in claim 2, wherein a secret key is used to initialize said storage means.

5. The generating apparatus as claimed in claim 1, wherein there is further included means for combining a plaintext digital data sequence and said first pseudo-random digital sequence to provide an encrypted digital data sequence.

6. The generating apparatus as claimed in claim 1, wherein said feedback means comprises a substitution block for converting said remaining bits of each of said pluralities of bits in a manner such that the integer formed by said converted remaining bits differs from the integer formed by said corresponding remaining bits that are inputted to said substitution block.

7. The generating apparatus as claimed in claim 1, wherein said feedback means comprises logic means for receiving as an input and converting said remaining bits of each of said pluralities of bits such that the integer formed by said converted, remaining bits is the same integer as that formed by said input of remaining bits.

8. The generating apparatus as claimed in claim 1, wherein said feedback means comprises logic means for receiving as an input said remaining bits of each of said pluralities of bits and for providing as an output a corresponding plurality of bits that form the integer equal to the sum of said input of said remaining bits.

9. The generating apparatus as claimed in claim 1, wherein said generating means comprises at least first and second feedback-connected shift registers whose output sequences are respectively at least said second and third periodic pseudo-random digital sequences.

10. The generating apparatus as claimed in claim 9, wherein the initial contents of said first and second feedback-connected shift registers are determined by a secret key.

11. The generating apparatus as claimed in claim 1, wherein said generating means comprises a first feedback-connected shift register having a plurality of stages, each of said stages having as an output a binary digital sequence, at least second and third feedback-connected shift registers for providing register output sequences, and means for combining said register output sequences of at least said second and third feedback-connected shift registers respectively with an output sequence from a different stage of said first feedback-connected shift register to provide thereby said second and third periodic, pseudo-random digital sequences.

12. The generating apparatus as claimed in claim 11 wherein the initial content of at least said second and third feedback-connected shift registers and said first feedback-connected shift register is determined by a secret key.

13. The generating apparatus as claimed in claim 1, wherein said summing means comprises first and second adder circuits, at least said second and third periodic, pseudo-random digital sequences being applied to said first adder circuit whose output is a first digital sum sequence of pluralities of bits, each of said pluralities of bits of said first digital sum sequence being the integer sum of the corresponding bits of at least said second and third pseudo-random sequences, said first digital sum sequence and said auxiliary digital sequence being applied as inputs to said second adder circuit whose output is a second digital sum sequence, said second digital sum sequence comprising a sequence of pluralities of bits, each of said pluralities of bits of said second digital sum sequence forming the integer sum of the corresponding integers formed by said pluralities of bits of said first digital sum sequence and said auxiliary digital sequence respectively.

14. A method of generating a complex first pseudo-random digital sequence, said method comprising the steps of:
 (a) generating at least second and third periodic, pseudo-random digital sequences;
 (b) summing said second and third periodic, pseudo-random digital sequences and an auxiliary digital sequence to obtain a digital sum thereof, said digital sum comprising a sequence of pluralities of bits, each of said pluralities of bits of said digital sum being the integer sum of the corresponding bits of at least said second and third pseudo-random digital sequences and of said auxiliary digital sequence, each of said pluralities of bits of said digital sum comprising a selected one bit and the remaining bits;
 (c) forming said complex first pseudo-random digital sequence as a sequence of said selected one bits; and
 (d) forming said auxiliary digital sequence as a sequence of said remaining bits of each of said pluralities of bits of said digital sum and for feeding back said auxiliary digital sequence to be summed with at least said second and third periodic, pseudo-random digital sequences as in step b, whereby said first pseudo-random digital sequence is rendered more complex than said second and third pseudo-random digital sequences.

15. The method of generating as claimed in claim 14, wherein there is further included the step of storing and delaying the application of said auxiliary digital sequence with respect to the receipt of said second and third periodic, pseudo-random digital sequences.

16. The method of generating as claimed in claim 14, wherein there is further included the step of initializing at least one initial bit of at least said second and third periodic, pseudo-random digital sequences according to a secret key.

17. The method of generating as claimed in claim 14, wherein there is further included the step of initializing the initial one of said pluralities of bits of said auxiliary digital sequence according to a secret key.

18. The method of generating as claimed in claim 14, wherein there is further included the step of combining a plaintext digital data sequence and first pseudo-random digital sequence to provide an encrypted digital data sequence.

* * * * *